Dec. 7, 1926.  W. SEVILLE  1,609,779
LUBRICATED END THRUST BEARING
Filed June 8, 1925  2 Sheets-Sheet 1
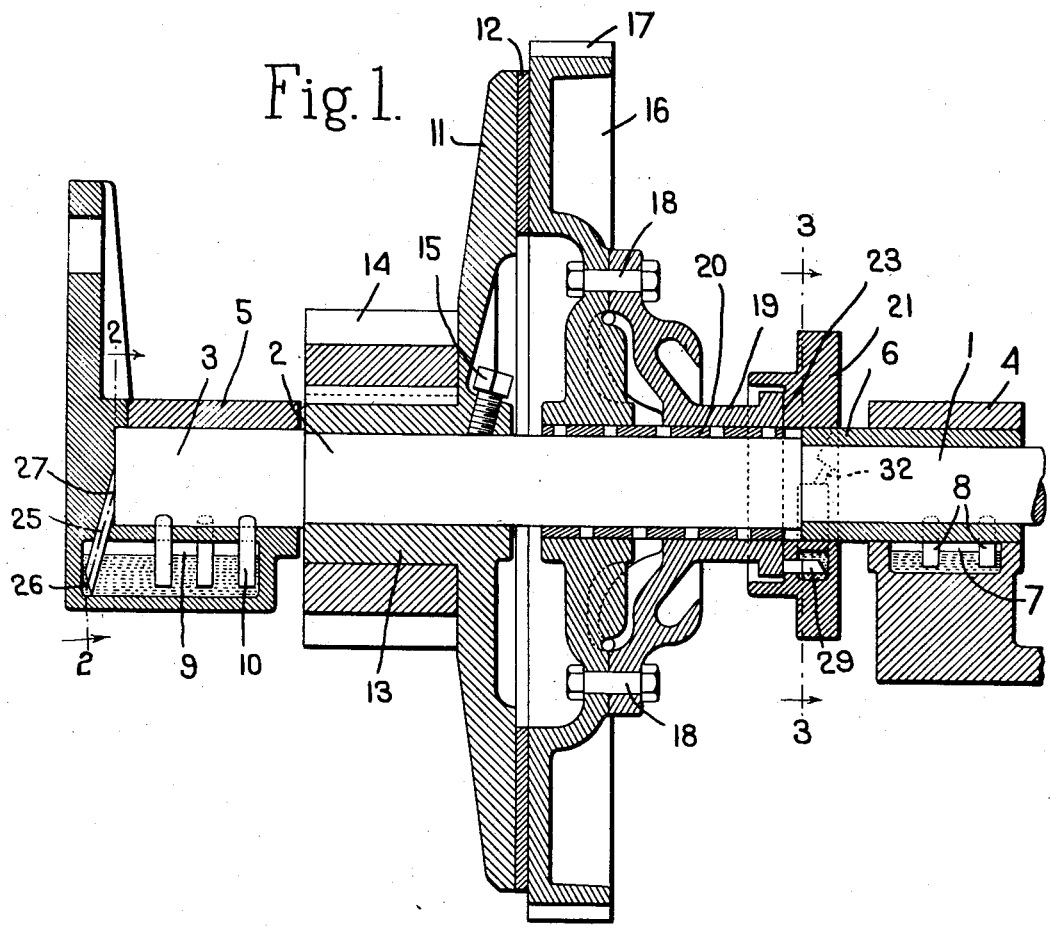
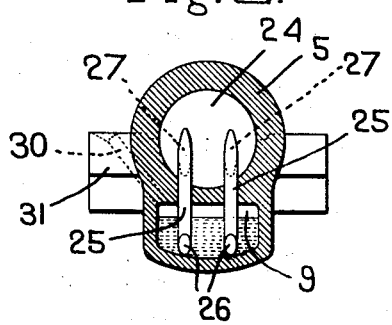
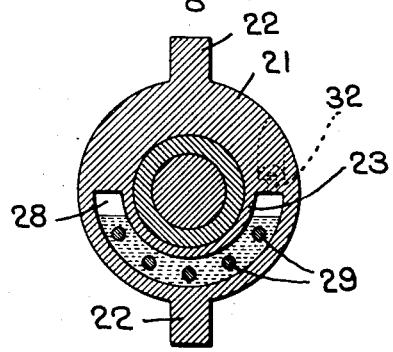
Inventor
William Seville
by Heard Smith & Tennant
Attys.

Dec. 7, 1926.

W. SEVILLE 1,609,779

LUBRICATED END THRUST BEARING

Filed June 8, 1925    2 Sheets-Sheet 2

Inventor.
William Seville
by Heard Smith & Tennant.
Attys.

Patented Dec. 7, 1926.

1,609,779

UNITED STATES PATENT OFFICE.

WILLIAM SEVILLE, OF HOPEDALE, MASSACHUSETTS, ASSIGNOR TO DRAPER CORPORATION, OF HOPEDALE, MASSACHUSETTS, A CORPORATION OF MAINE.

LUBRICATED END-THRUST BEARING.

Application filed June 8, 1925. Serial No. 35,592.

This invention relates to a simple and efficient means for securing thorough lubrication in an end thrust bearing at the surface taking the end thrust.

The object of the invention is further to provide a simple and efficient means wherein the lubricant maintained in a reservoir in the bearing is continually taken and raised from the reservoir and fed to the end thrust surface in such a manner as to provide continuous and ample lubrication.

The object of the invention is further to provide a simple and efficient means for the lubrication of the end thrust bearing surfaces of a clutch pulley construction such as used in looms and similar machines.

The nature and objects of the invention will appear more fully from the accompanying description and drawings and will be particularly pointed out in the claims.

The present invention is designed particularly for the lubrication of end thrust surfaces occurring in connection with a friction clutch pulley for a loom where the end thrust occurs at the end surface of the shaft and also at the face of the clutch pulley follower, but it is applicable to a wide range of uses and the construction illustrated, in so far as the main elements of the machine are concerned, is selected merely for a convenient disclosure of the invention.

In the drawings:

Fig. 1 is a view in vertical cross section of a shaft, its bearings and a friction clutch construction such as employed in looms, together with preferred forms of end thrust bearings embodying the present invention.

Fig. 2 is a view in vertical cross section taken on the line 2—2 of Fig. 1 with the plugs left in elevation.

Fig. 3 is a view in vertical cross section taken on the line 3—3 of Fig. 1.

Figure 4:
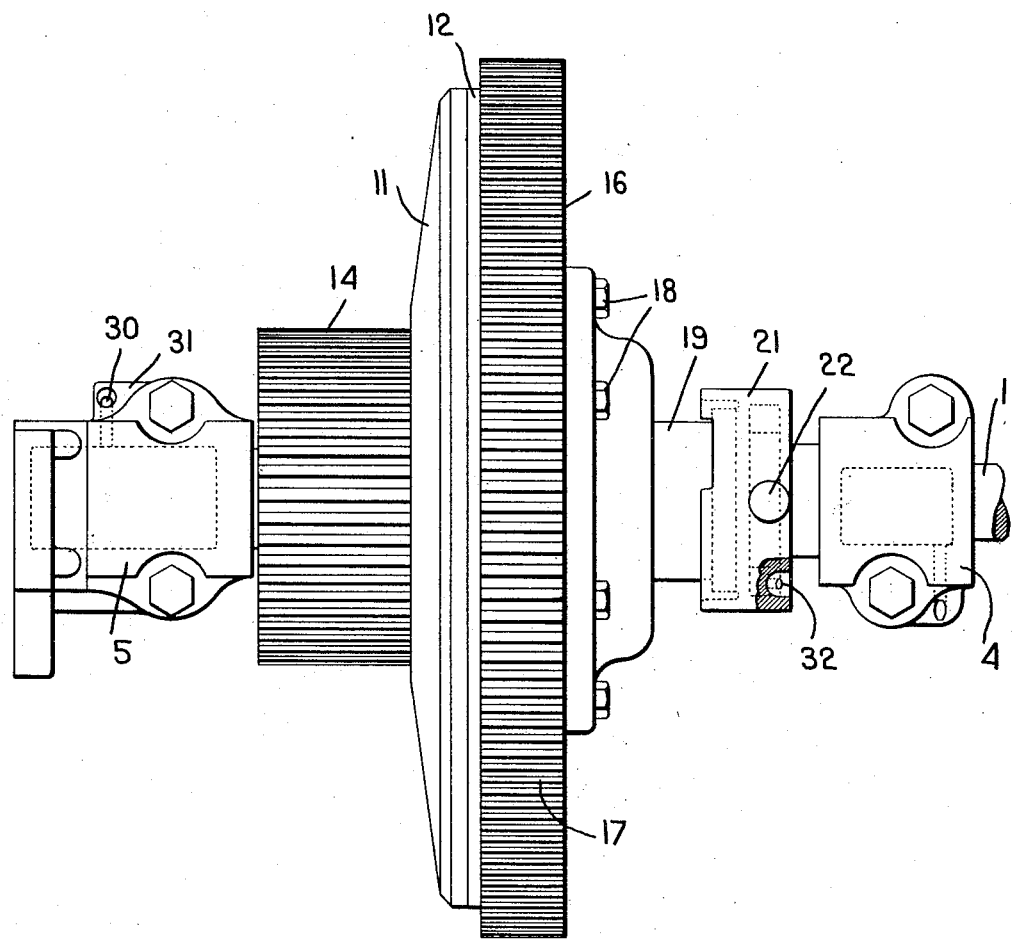
Fig. 4 is a top plan view of the construction shown in Fig. 1 with a small portion thereof broken away.

The shaft shown is that of a loom, the end of the shaft being in three integral sections, 1, 2 and 3, of increasing diameter and separated by square shoulders. The end portion of this shaft is shown as mounted in two bearings, the section 1 being mounted in a bearing 4 and the section 3 in the bearing 5. The bearing 4 at the right has driven therein a bushing 6. A lubricant reservoir 7 is formed in this bearing and lubricant-transmitting plugs 8 extend from this reservoir through the bushing 6 to the surface of the shaft section 1 and thus secure the lubrication of the shaft in this bearing.

The end section 3 of the shaft is shown as supported directly in the bearing 5 and this bearing also has formed therein the lubricant reservoir 9 and lubricant-transmitting plugs 10 extend from this reservoir through the lower wall of the bearing to the surface of the shaft section 3 and thus secure the lubrication of this section in the bearing.

The present invention is shown in connection with a friction disk clutch pulley, the operation of which produces a substantial end thrust at the outer end of the shaft against its bearing and also a substantial end thrust between the elements employed in effecting the engagement of the clutch. There are thus two end thrust bearings illustrated in which are embodied preferred forms of the invention.

In the construction illustrated, a friction disk 11, provided with a suitable friction surfacing 12 and having a hub 13 which may carry a gear 14 splined thereon, is rigidly secured to the shaft section 2 as by means of the set screw 15. The pulley 16, which may also be provided with gear teeth 17, is made in sections to provide certain lubricating features not concerned with the present invention and these sections are shown as secured together by the bolts 18. The pulley presents an extended hub 19 provided with a bushing 20 driven therein and having its bearing on the central section 2 of the shaft. The pulley is assumed to be the member to which the power is applied and when separated from the clutch disk, turns freely on the shaft, but when forced into engagement with the clutch disk, acts to effect the rotation of the shaft. The clutch pulley is slid back and forth on the shaft into and out of clutching engagement with the friction disk by means of a sleeve 21 held against rotation in any suitable manner. In the construction illustrated, pins 22, projecting from the sleeve, engage the device for operating the sleeve, not shown, and prevent rotation of the sleeve. This sleeve 21 has its bearing on the exterior of the bushing 6 and presents an annular end thrust surface 23 opposite the end of the hub 19.

It will thus be seen that when the pulley is held in clutching engagement with the friction disk, end thrust occurs at two places, first, between the extreme outer end 24 of the shaft section 3 and the end surface of the bearing 5 against which it abuts, and, second, between the end surface of the pulley hub 19 and the surface 23 of the sleeve against which the pulley hub abuts. In the operation of the loom or other machine employing such a construction, these two end thrust bearings are in constant engagement while the machine is running and therefore require thorough and efficient lubrication. Such lubrication is provided in the present invention by means of rigid, longitudinally porous, lubricant-transmitting plugs which may be formed of wood cut lengthwise of the grain so that the pores serve to transmit the lubricant, or which may be formed of porous metal such as now may be obtained on the market and through the pores of which the lubricant is transmissible. These plugs fit tightly in passages in the respective bearings and extend between a lubricant-containing reservoir formed in the bearing and the end thrust surface of the bearing. The space available for plugs of this type in an end thrust bearing is limited and it is the main object of the invention to provide a construction in which ample lubricant may thus be transmitted to the end thrust surfaces, notwithstanding the limited space available. This result is secured by forming the face at that end of the plug immersed in the lubricant reservoir on the bias so that a relatively large end area of the plug is immersed in the lubricant and thus admission to the transmitting pores of an ample amount of lubricant is secured. Furthermore, where possible, the plug is arranged at an acute angle to the axis of the bearing and has its end face exposed at the thrust surface also formed on the bias or at a supplemental angle so as to coincide with the thrust surface and thus to present a relatively large area of exposed lubricant-transmitting surface. Furthermore, a plurality of these lubricant-transmitting plugs are arranged in separate passages in the bearing with the ends exposed at the end thrust bearing surface arranged in the same annular zone so as to secure transmission of sufficient lubricant to the thrust surface where it is inconvenient so to arrange the plugs as to lubricate the entire surface. Furthermore, the plug is prevented from endwise movement away from the thrust bearing surface without any danger of impeding the admission of lubricant to the pores of the plug by having the edge of its bias-formed end seated against the wall of the lubricant reservoir.

Referring first to the construction illustrated in connection with the end surface 24 of the shaft section 3, the lubricant containing reservoir 9, already described, is utilized to furnish the lubricant for the end thrust bearing. In this case, two plugs 25 are shown extending through separate passages in the bearing. The lower ends 26 of these plugs are cut on the bias or at an acute angle to the axes of the plugs and these ends at their lower edges, as best seen in Fig. 1, rest against the wall of the lubricant reservoir 9. Thus it will be seen that a relatively large end area of the plug in each case is exposed to the lubricant, and at the same time endwise movement of the plug away from the thrust surface is prevented. These plugs are also arranged with their axes extending at an acute angle to the axis of the shaft section 3 and at their upper ends 27 are formed on the bias to coincide with the end thrust surface and thus extend at an angle which is a supplement to the acute angle between the axis of the plug and the axis of the shaft. It will also be observed that the end surfaces 27 of these plugs are exposed at the same annular zone of the thrust surface. Thus, in the limited space available, the required amount of lubricant is supplied to the end thrust bearing and particularly where the end surfaces of the plug are formed on the bias, it is possible actually to feed the lubricant to practically the entire end thrust surface.

In the construction illustrated in connection with the other end thrust bearing, the space available is also limited, but in a different way. Here the lubricant-containing reservoir 28 is formed in the lower half of the sleeve 21 and is thus an arc-shaped chamber. The lubricant-transmitting plugs 29 are here arranged parallel with the axis of the shaft and at right angles to the end thrust surface because of the limited space available, but a larger number are here possible and thus serve to transmit the required amount of lubricant. These plugs 29 at the ends immersed in the lubricant reservoir are formed in the same way as the plugs 25 and function in the same way. The opposite ends of these plugs exposed at the thrust surface 23 and acting to lubricate the end of the hub 19 are not formed on the bias because of the limitations of the space, but are arranged to transmit the lubricant to the same annular zone of the thrust surface as shown in Fig. 3, and by reason of the larger number which may be provided in the space available, serve to effect ample lubrication.

Any suitable lubricant, such as oil, which will be transmitted through the pores of the plugs, may be employed. The lubricant reservoirs should be kept well supplied. The reservoir 9 is shown as filled through a duct 30 opening through the flange 31 and the lubricant reservoir 28 is shown as filled through a duct 32 opening at the end surface of the sleeve 21.

The size and number of the plugs will vary in accordance with the size of the bearing and the space that is available. The constructions illustrated are for the purpose of disclosing the principles of the invention which are applicable to a wide range of end thrust bearings and by means of which ample lubrication may be secured under difficult conditions.

Having thus described the invention, what is claimed as new, and desired to be secured by Letters Patent, is:

1. A lubricated, end thrust bearing comprising a lubricant containing reservoir, a plurality of rigid, longitudinally porous, lubricant transmitting plugs tightly fitting separate passages in the bearing extending between the reservoir and the thrust surface, the ends of the plugs in the reservoir having their faces formed on the bias and immersed in the lubricant to insure admission to the transmitting pores of an ample amount of lubricant and the opposite ends of the plugs extending flush with the thrust surface to insure transmission of sufficient lubricant to the thrust surface where available space for the plugs is limited.

2. A lubricated, end thrust bearing comprising the construction defined in claim 1, in which the said reservoir is of arcuate shape in vertical cross section, and in which the plugs are arranged in parallelism.

In testimony whereof, I have signed my name to this specification.

WILLIAM SEVILLE.